March 25, 1924.
W. C. HARLEY
1,488,152
HOLDER FOR DRIVERS' LICENSES AND AUTOMOBILE REGISTRATION CARDS
Filed Feb. 15, 1921
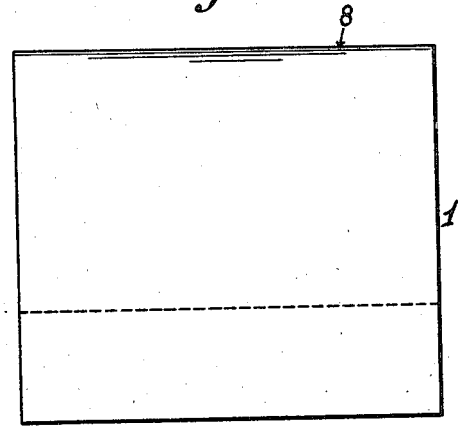
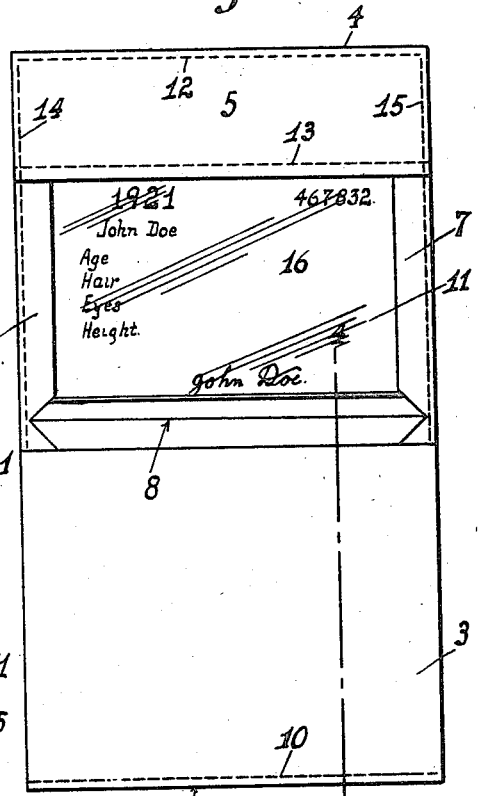
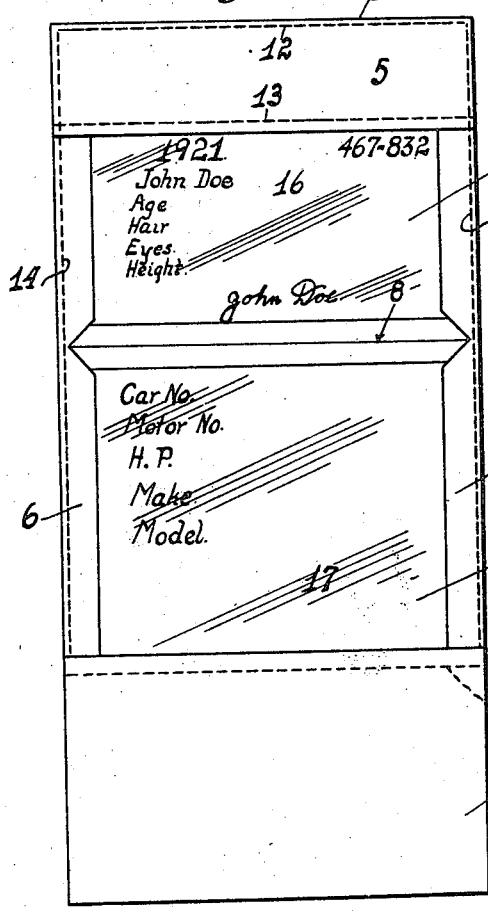
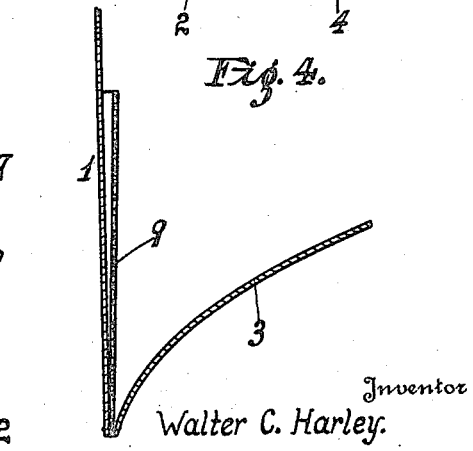
Inventor
Walter C. Harley.
By Harry C. Schroeder
Attorney Patented Mar. 25, 1924.

1,488,152

UNITED STATES PATENT OFFICE.

WALTER C. HARLEY, OF OAKLAND, CALIFORNIA.

HOLDER FOR DRIVERS' LICENSES AND AUTOMOBILE REGISTRATION CARDS.

Application filed February 15, 1921. Serial No. 445,238.

*To all whom it may concern:*

Be it known that I, WALTER C. HARLEY, a citizen of the United States, residing at Oakland, in the county of Alameda and State of California, have invented certain new and useful Improvements in Holders for Drivers' Licenses and Automobile Registration Cards, of which the following is a specification.

My invention is an automobile driver's license and automobile registration card holder which may be secured to the inside of the dash or other part of the body of the automobile.

Referring to the annexed drawing in which my invention is illustrated:

Figure 1 is a front view of my holder closed.

Figure 2 is a front view of my holder partly open showing the license card.

Figure 3 is a front view of my holder completely open showing both the license and registration card.

Figure 4 is a cross section of the lower portion of the holder on the line 3—3 of Figure 2 with the registration card flap bent outward.

My holder may be made of a single sheet of leather, imitation leather or other suitable material indicated 1. The sheet is bent upwardly and forwardly upon itself on a line 2, forming a flap 3. The sheet 1 is bent forwardly and downwardly on a line 4 forming a flap 5. The sheet is bent forwardly and inwardly at its side edges between lines 2 and 4 forming side flanges 6 and 7. The sheet is folded forwardly upon itself on a line 8 midway between lines 2 and 4. A sheet of mica 9 is placed under the flanges 6 and 7 and flap 3 below the line 8. The flap 3 and mica sheet 9 are sewed to the sheet along their lower edge by a line of stitching 10, the flap being sewed over the flanges 6 and 7 so that it folds thereon. A sheet of mica 11 is placed under the flanges 6 and 7 and the flap 5. The flap 5 is folded over the flanges 6 and 7. The flap 5 and flanges 6 and 7 and the mica sheet 11 are sewed to the sheet by rows of stitching 12, 13, 14 and 15; the stitching 12 extending near the upper edge of the flap, the stitching 13 extending near the lower edge of the flap, and the stitching 14 and 15 extending along the side edges of the flap, flanges and mica sheet. The stitching 14 and 15 also extend through the side edges of the mica sheet 9 and hold it to the sheet 1. The automobile driver's license 16 is inserted upwardly under the mica sheet 11 which forms a pocket for the license. The automobile registration card 17 is inserted downwardly under the mica sheet 9 which forms a pocket for said card.

The sheet 1 is secured to the inside of the automobile dash or other part below the line 8. The flap 3 is folded upwardly over the flanges 6 and 7 and the mica sheet 9, covering the registration card 17. The sheet 1 is folded downwardly on line 8 which closes the holder, covering the license 16.

Having described my invention, I claim:

1. A holder for an automobile registration card and a driver's license, including a sheet formed with side flanges, a lower flap and an upper flap, said flaps being folded over said flanges, a sheet of mica being inserted under said flanges and said lower flap, a sheet of mica being inserted under said flanges and said upper flap, the upper part of the holder containing the license being foldable over the lower part of the holder containing the registration card.

2. A holder for an automobile registration card and a driver's license, including a sheet formed with side flanges, a lower flap and an upper flap, said flaps being folded over said flanges, a sheet of mica being inserted under said flanges and said lower flap, under which mica sheet the automobile registration card is placed, a sheet of mica being inserted under said flanges and said upper flap, under which mica sheet the driver's license is inserted, said mica sheets being sewed to said flanges and to the sheet, an additional row of stitching above the upper sheet of mica, the upper part of the holder containing the license being foldable over the lower part of the holder containing the registration card.

3. A holder for an automobile registration card and a driver's license, including a sheet formed with side flanges, a lower flap and an upper flap, said flaps being folded over said flanges, a sheet of mica being inserted under said flanges and said lower flap, a sheet of mica being inserted under said flanges and said upper flap, the upper part of the holder containing the license being foldable over the lower part of the holder containing the registration card and the side flange having cut away portions on the line of fold of the upper and lower parts of the holder.

In testimony whereof I affix my signature.

WALTER C. HARLEY.